(12) United States Patent
Dyatlov et al.

(10) Patent No.: US 6,727,003 B1
(45) Date of Patent: Apr. 27, 2004

(54) COATING MATERIAL COMPRISING LINEAR ISOTACTIC POLYMERS

(75) Inventors: Valery Alexandrovich Dyatlov, Moscow (RU); Bernhard Hanke, Bad Schwalbach (DE); Bernhard Rieger, Ulm (DE); Mike Orroth, Richmond (GB)

(73) Assignee: The Procter & Gamble Company, Cincinnati, OH (US)

( * ) Notice: Subject to any disclaimer, the term of this patent is extended or adjusted under 35 U.S.C. 154(b) by 51 days.

(21) Appl. No.: 10/089,345

(22) PCT Filed: Oct. 2, 2000

(86) PCT No.: PCT/US00/27136

§ 371 (c)(1),
(2), (4) Date: Mar. 27, 2002

(87) PCT Pub. No.: WO01/27170

PCT Pub. Date: Apr. 19, 2001

(30) Foreign Application Priority Data

Oct. 8, 1999 (EP) .............................................. 99120173

(51) Int. Cl.$^7$ ............................................... B32B 27/32
(52) U.S. Cl. ....................... 428/523; 428/515; 428/516; 427/421; 427/430
(58) Field of Search ................. 428/515, 516, 428/523; 427/430.1

(56) References Cited

U.S. PATENT DOCUMENTS

| | | | |
|---|---|---|---|
| 4,522,982 A | | 6/1985 | Ewen |
| 4,820,589 A | * | 4/1989 | Dobreski et al. ............ 428/422 |
| 5,254,394 A | * | 10/1993 | Bothe et al. ................. 428/212 |
| 5,969,070 A | * | 10/1999 | Waymouth et al. ......... 526/351 |
| 6,114,261 A | * | 9/2000 | Strelow et al. ............. 442/153 |
| 6,348,272 B1 | * | 2/2002 | Haveaux et al. ............ 428/516 |
| 6,555,643 B1 | * | 4/2003 | Rieger ....................... 526/351 |
| 6,576,726 B1 | * | 6/2003 | Rieger ....................... 526/160 |

FOREIGN PATENT DOCUMENTS

| | | |
|---|---|---|
| DE | 197 09 486 A1 | 9/1998 |
| DE | 198 16 154 A1 | 10/1999 |
| GB | 1 001 080 A | 1/1979 |
| WO | WO 94/28066 A2 | 12/1994 |
| WO | WO 95/25757 A1 | 9/1995 |
| WO | WO 96/20225 A2 | 7/1996 |
| WO | WO 96/26967 A1 | 9/1996 |
| WO | WO 96/38458 A1 | 12/1996 |
| WO | WO 99/20664 A2 | 4/1999 |

OTHER PUBLICATIONS

Dietrich et al., "Control of Stereoerror Formation with High–Activity Dual–Side Zirconecene Catalysts: A Novel Strategy To Design the Properties of Thermoplastic Elastic Polypropenes", J. Am. Chem. Soc., May 12, 1999, vol. 121, pp. 4348–4355.

Rieger et al., "Novel Metallocene Catalyzed Polypropene Homo– and Brush–Copolymers: Control of New Morphologies and Beyond", Polymer Bulletin, DE, Springer Verlag, vol. 32, Jan. 1, 1994, pp. 51–52.

Rieger et al., "Stereospecific propene polymerization with rac–[1,2–bis($n^5$–(9–fluorenyl))–1–phenylethane]zirconium dichloride/methylalumoxane", Polymer Bulletin, DE, Springer Verlag, vol. 32, Jan. 1, 1994, pp. 41–46.

* cited by examiner

*Primary Examiner*—D. Lawrence Tarazano
(74) *Attorney, Agent, or Firm*—Angela Marie Stone

(57) ABSTRACT

The present invention relates to articles comprising elements at least partially coated with polymeric material wherein the structure of the polymeric material contains elastic amorphous areas of nano-scale-size reinforced with self arranged crystalline domains of nano-crystals. An article, comprising an element and a polymeric coating material covering at least portion of the surface of said element characterized in that said coating material comprises a polyolefinic homopolymer having an isotacticity of less than 60% of mmmm pentad concentration, is claimed.

7 Claims, No Drawings

COATING MATERIAL COMPRISING LINEAR ISOTACTIC POLYMERS

FIELD OF THE INVENTION

The present invention relates to coating materials used for example in insulation, shock absorption, cushioning, packaging. Specifically, the present invention relates to elastic coating materials.

BACKGROUND

Coated articles and in particular coating materials comprising olefinic polymers are well known in the art and enjoy widespread usage throughout the industry. Typical areas of application of such coating material include hygienic articles and in particular disposable absorbent articles, packaging materials.

Coating materials made from commonly used polyolefins such as PP, PE, PS PIB have a number of useful properties. They are bio-compatible and food compatible, chemically stabile, inert, non toxic materials. However, most of them are rigid and have poor mechanical properties including insufficient strength/tear resistance, insufficient stretchability/elasticity and the like.

Several approaches have been proposed in the prior art to provide elastic properties to such polymeric coating materials. The most commonly used approach is based on changing the chemical structure of the polymer by introducing hinged joints/moieties into the main chain of the polymer. These hinges provide more flexibility to the polymeric backbone preventing crystallization of polymer, lowering the glass transition temperature (Tg) and improving the elasticity of the resulting material. Usually, the hinge groups contain heteroatoms providing flexibility such as oxygen, nitrogen or chlorine placed into the main chain or into bulky side groups. Another approach is mastication of the polymer by blending with special plasticizing agents. Both approaches, however, require heteroatoms to be introduced into the molecule or into the bulk of the coating material.

The third approach proposed in the prior art to provide elastic properties to such polymeric coating materials, which is more close to the present invention, is to exploit the formation of hetero-phases which reinforce the bulk material by forming a physical net. To do this the block-co-polymerization of two or more different monomers has been used leading to polymeric backbones comprising blocks with different Tg. This results in micro-phase separation in the bulk with formation of reinforcing crystalline domains of one co-polymer linked with each other by flexible chains of the second co-polymer.

In essence, conventional polymeric coating material carry a wide variety of inherent disadvantages including but not being limited to insufficient strength/tear resistance, insufficient stretchability/elasticity, not being bio-compatible, not being food compatible, comprising heteroatoms such as chlorine and hence leading to toxic residues when burnt, and the like.

It is an object of the present invention to provide coating materials which overcome the disadvantages of the prior art coating materials.

It is an further object of the present invention to provide articles which comprise elastic coating materials.

It is an further object of the present invention to provide a method for manufacturing a coated article of the present invention.

SUMMARY OF THE INVENTION

The present invention provides a coating composition for covering at least a portion of the surface of an element with a polymeric coating characterized in that said coating composition comprises a polyolefinic homopolymer having an isotacticity of less than 60% of [mmmm] pentad concentration.

The present invention further provides an article comprising an element and the aforementioned polymeric coating material covering at least portion of the surface of said element.

The present invention further provides a method for coating an element with the aforementioned polymeric coating material comprising a step selected from the group of dip coating, spray coating, emulsion coating, and combinations thereof.

DETAILED DESCRIPTION OF THE INVENTION

The present invention provides coating materials comprising a polyolefinic homopolymer.

The present invention provides coating materials comprising a polyolefinic homopolymer.

The term "polyolefinic homopolymer" as used herein refers to those polyolefins which comprise only one phase of molecules all of which exhibiting a similar stereochemical configuration. For example, blends of atactic and isotactic polymers where the two phases have polymerized simultaneously are excluded when this term is used. The term homopolymer includes copolymers where all molecules exhibit a similar stereochemical configuration.

The polyolefinic homopolymer of the present invention may comprise linear isotactic polymers having a structure of one or several $C_3$ to $C_{20}$ olefinic monomers, having an isotacticity of less than 60%, preferably less than 55%, more preferably less than 50%, and most preferably less than 45% of [mmmm] pentad concentration, and having an isotacticity of more 15%, preferably more than 20%, more preferably more than 25%, and most preferably more than of [mmmm] pentad concentration. Preferably, the polyolefinic homopolymer is polypropylene.

The isotacticity of the homopolymers may be reduced compared to the isotactic polypropylenes of the prior art due to a statistic distribution of stereoscopic errors in the polymer chain. The term "stereoscopic error" refers to a stereoscopic sequence characterized by a [mrrm] pentad. In this case, the central monomer has a stereo configuration opposed to the other four monomers in this pentad. The [mrrm] pentad concentration of this polymer therefore is above the statistical probability of $p^2 (1-p)^2$ where p=[m] and hence 1−p=[r] and $p^4$=[mmmm]. Preferably, the pentad concentration is at least $[p(1-p)]^q p(1-p)$ with q being 0.8, more preferably q being 0.6, yet more preferably q being 0.4, yet more preferably q being 0.2, most preferably q being 0.1.

In some embodiments of the homopolymer and in particular in those embodiments where the crystallinity is reduced by means of single stereo errors, a low content of atactic sequences has proven beneficial to the properties of the coating of the present invention. Preferably, the [rmrm] pentad concentration is below 6%, more preferably below 5%, yet more preferably below 4%, yet more preferably below 3%, most preferably below 2.50%.

In some embodiments of the homopolymer and in particular in those embodiments where the crystallinity is reduced by means of single stereo errors, a low content of syndiotactic sequences has proven beneficial to the properties of the coating of the present invention. Preferably, the [rrrr] pentad concentration is below 6%, more preferably below 5%, yet more preferably below 4%, yet more preferably below 3%, most preferably below 2.5%.

Alternatively, the homopolymer of the present invention may include sequences of atactic and isotactic blocks of polymer. Preferably, the mean molecular weight $M_w$ of the polymer is above 100000 g/mol, more preferably above 200000 g/mol, yet more preferably above 250000 g/mol, yet more preferably more than 300000 g/mol, most preferably more than 350000 g/mol.

The glass temperature $T_g$ is between −50 and +30° C. Preferably the glass temperature is below 10° C., more preferably below 5° C., yet more preferably below 0° C., most preferably below −6° C. The melt temperature of the polymer is obtained after heating the sample 150° C. and subsequently cooling the polymer to −50° C.

Without wishing to be bound by this theory, the polyolefinic polymers exhibit a semi-crystalline structure. The structure contains elastic amorphous areas of nano-scale-size reinforced with self arranged crystalline domains of nano-crystals. The formation of brittle macro-crystalline material from the polymer is achieved by introducing the defects into the polymeric backbone. Isolated monomer units with opposite stereo configuration have been used as the defects, i.e. single stereo errors.

Suitable polymers and a process for manufacturing such polymers are described in PCT patent application EP99/02379 incorporated herein by reference. A catalyst combination suitable for the preparation of such polymers is described in PCT patent application EP99/02378 incorporated herein by reference. Preferably, the process of PCT patent application EP99/02378 is carried out by temperatures of less than 30° C., more preferably less than 25° C., yet more preferably less than 20° C., most preferably less than 15° C. to increase the molecular weight of the resulting polymer. In order to increase the molecular weight, the polymerization is preferably carried out in liquid monomer such as in liquid propene. In order to increase the molecular weight, the catalyst is preferably used in combination with the boron activators mentioned in PCT patent application EP99/02378.

Other suitable polymers and a process for manufacturing such polymers is described in WO99/20664 incorporated herein by reference.

It is preferred to use homopolymers for the coatings of the present invention since during manufacture of homopolymers the batch to batch variability is greatly reduced in comparison to multi phase polymers where the phases are polymerized in a single reaction.

Preferably, the polymers used in manufacturing the coating materials of the present invention have a distinctive rubber-elastic plateau in their tensile-strength curves.

The polymers used for the coating of the present invention are bio-compatible may be burnt without toxic residues since they contain no heteroatoms such as chlorine. The further do not contain toxic monomer residues.

The coating materials of the present invention have been found to be able exhibit superior softness. Preferably, the coating material has a Shore hardness on the A scale of less than 30, more preferably, of less than 25, yet more preferably of less than 20, yet more preferably of less than 15, most preferably of less than 10. The softness of the coating material of the present invention can be increased by manufacturing the coating by reducing the isotacticity ([mmmm] pentad concentration).

The coating material has been found to exhibit increased temperature stability compared to prior art coating materials. This is partly due to the fact that for the coatings of the present invention a homopolymer is used and is partly due to the high molecular weight of the homopolymer. Preferably, the coating material of the present invention has a melting point of at least 100° C., more preferably of at least 110° C., more preferably of at least 120° C., most preferably of at least 130° C. The melt temperature of the polymer is obtained after heating the sample 150° C. and subsequently cooling the polymer to −50° C. Higher melting point may be achieved my blending the homopolymer for example with conventional isotactic polymer such as polypropylene.

The coating of the present invention have been found to be stretchable as well as elastic. The stretchability of the coating versus its elastic behavior can be adjusted by means of the tacticity of the homopolymer of the present invention. The coating material of the present invention has been found to be stretchable without tearing to at least 500% of its original length, more preferably 1000% of its original length, yet more preferably to at least 1500% of its original length, most preferably to at least 2000% of its original length. In addition, the coating material of the present invention preferably recovers within 10 minutes after being stretched and held for 1 minute to 500% of its original length back to less than 300% its original length, preferably less than 200% its original length, most preferably less than 150% of its original length. In addition, the coating of the present invention has been found to exhibit a low compressive set. The coating of the present invention recovers within 10 minutes after a compression to 50% of its original thickness for 1 minute to at least 60% of its original thickness, more preferably at least 70% of its original thickness, yet more preferably to at least 80% of its original thickness, yet more preferably to at least 90% of its original thickness, most preferably to at least 95% of its original thickness. The compressibility of the coating of the present invention can be adjusted by increasing the tacticity of the homopolymer or by blending the low tacticity homopolymer with conventional isotactic polymer such as polypropylene.

It has been found that the coating of the present invention can be applied at relatively low basis weights. Preferably, the basis weight of the coating of the present invention is less than 50 grams per square meter, more preferably less than 40 g/m$^2$, yet more preferably less than 30 g/m$^2$, yet more preferably less than 20 g/m$^2$, most preferably less than 10 g/m$^2$.

The coating of the present invention has been found to exhibit a relative low tackiness at room temperature due to the high molecular weight of the polymer.

Various additives may be added to the homopolymer of the present invention to change the properties of the polymer such as is well known in the art.

It is a further aspect of the present invention to provide an article comprising an element, at least a portion of the surface the element being covered with the coating material according to the present invention.

In the prior art, a wide variety of suitable techniques to manufacture coating articles are known including but not being limited to dip coating, spray coating, emulsion coating, and combinations thereof. The coating of the present invention is not limited to a specific substrate as long as the polymer of the coating is capable of sufficiently adhering to the substrate material. Suitable substrates include but are not limited to bodies of various material such as metal, polymer, wood, and the like, woven and nonwoven web materials, films, and the like. The aforementioned methods for manufacturing coating articles all have specific advantages which are known to the skilled person. Hence, the skilled person will be able to select a suitable method for manufacturing the coating material of the present invention depending on the specific requirement of the respective application of the coating material.

In order to render the coating of the present invention breathable, the polymer may be mixed with a particulate filler material such as calcium carbonate prior to manufacturing the coating and be stretched subsequently (before or after contacting the substrate) in order to create micro pores at the location of the included filler material by stretching the coating material. Preferably, the breathable film material of the present invention has a moisture vapor transmission rate (MVTR) of at least 1000 g per 24 hours per square meter, more preferably at least 2000 g/24 hours/m$^2$, yet more preferably at least 3000 g/24 h/m$^2$, most preferably at least 4000 g/24 h/m$^2$. The method of determining MVTR is well known in the art and should be applied accordingly.

The coated article of the present invention could be a hygienic article. The term "hygienic article" as used herein refers to articles which are intended to be used in contact with or in proximity to the body of a living being. Such hygienic articles may be disposable or intended for multiple or prolonged use. Such hygienic articles include but are not limited to gowns, surgical drapes, body implants, instrumentation, support means, bed covers, wound coverings, wound sprays, hair sprays, and the like. Having regard to the specific advantages of the polymers used for the articles of the present invention, it will be readily apparent to the skilled practitioner to apply the coatings of polymeric material according to the present invention in the above and similar hygienic articles.

The coating material according to the present invention may also be used as a construction element in an article. Thereby, the functionalities of the coating material includes but is not limited to heat insulation, electric insulation, shock absorption, cushioning, acoustic wave damping, protecting other elements of the article, corrosion protection, allowance for relative movement of other elements, slip reduction, and the like. Such articles include but are not limited to toys, furniture, clothing, shoes, sport equipment, grips, complex constructions such as buildings (floor coverings, caulking, sealants, ridge/crack filler, and the like), cars, household appliances, and the like. Having regard to the specific advantages of the polymers used for the articles of the present invention, it will be readily apparent to the skilled practitioner to apply and to optionally modify the coating materials according to the present invention as construction elements in the above and similar articles.

What is claimed is:

1. An article comprising an element and a polymeric coating material covering at least portion of the surface of said element characterized in that said coating material comprises a polyolefinic homopolymer having one phase of molecules all of which exhibit a similar stereochemical configuration and having an isotacticity of less than 60% of [mmmm] pentad concentration, a [rmrm] pentad concentration below 3%. and a [rr] pentad concentration below 6%.

2. An article according to claim 1 wherein said polymeric coating material is stretchable.

3. An article according to claim 2 wherein said coating material is elastically expandable.

4. An article according to claim 1 wherein said homopolymer is polypropylene.

5. An article according to claim 1 wherein article is a hygienic article.

6. An article according to claim 1 wherein said polymeric coating is a constructional element of the article.

7. A method for coating an element with a polymeric coating material comprising a step selected from the group of dip coating, spray coating, emulsion coating, and combinations thereof, characterized in that said polymeric coating material comprises a polyolefinic homopolymer having one phase of molecules all of which exhibit a similar stereochemical configuration and having an isotacticity of less than 60% of [mmmm] pentad concentration, a [rmrm] pentad cocentration below 3%. and a [rr] pentad concentration below 6%.

* * * * *

UNITED STATES PATENT AND TRADEMARK OFFICE
CERTIFICATE OF CORRECTION

PATENT NO. : 6,727,003 B1
DATED : April 27, 2004
INVENTOR(S) : Dyatlov et al.

It is certified that error appears in the above-identified patent and that said Letters Patent is hereby corrected as shown below:

<u>Column 6,</u>
Line 19, "[rr]" should be deleted and -- [rrrr] -- should be substituted therefor
Line 38, "[rr]" should be deleted and -- [rrrr] -- should be substituted therefor Signed and Sealed this Twenty-sixth Day of April, 2005

JON W. DUDAS
*Director of the United States Patent and Trademark Office*